United States Patent
Jalaldeen et al.

(10) Patent No.: US 10,081,437 B2
(45) Date of Patent: Sep. 25, 2018

(54) DELIVERING SELECTED PRODUCTS WITH AERIAL DRONES

(71) Applicant: International Business Machines Corporation, Armonk, NY (US)

(72) Inventors: Ahamed Jalaldeen, Bangalore (IN); Chivukula V. L. Narayana, Bentonville, AR (US)

(73) Assignee: International Business Machines Corporation, Armonk, NY (US)

( * ) Notice: Subject to any disclaimer, the term of this patent is extended or adjusted under 35 U.S.C. 154(b) by 30 days.

(21) Appl. No.: 15/185,382

(22) Filed: Jun. 17, 2016

(65) Prior Publication Data
US 2017/0361942 A1 Dec. 21, 2017

(51) Int. Cl.
| | |
|---|---|
| *B64D 31/06* | (2006.01) |
| *B64D 27/02* | (2006.01) |
| *B64D 5/00* | (2006.01) |
| *G08G 5/00* | (2006.01) |

(52) U.S. Cl.
CPC ............ *B64D 31/06* (2013.01); *B64D 27/02* (2013.01); *G08G 5/0039* (2013.01); *B64C 2201/128* (2013.01); *B64D 2027/026* (2013.01)

(58) Field of Classification Search
CPC ....... B64D 31/06; B64D 27/02; G08G 5/0039
USPC .......................................................... 701/10
See application file for complete search history.

(56) References Cited

U.S. PATENT DOCUMENTS 9,536,216 B1 * 1/2017 Lisso .................. G06Q 10/0832
9,656,805 B1 * 5/2017 Evans .................. B65G 1/1373
2012/0113754 A1 * 5/2012 Husseiny ............... H04R 27/00
367/139
2014/0032034 A1 1/2014 Raptopoulos et al.
2014/0164126 A1 6/2014 Nicholas et al.
2014/0254896 A1 9/2014 Zhou et al.
2015/0269521 A1 * 9/2015 Knapp ............. G06Q 10/08355
705/338

(Continued)

FOREIGN PATENT DOCUMENTS

WO WO-2010023253 A1 * 3/2010 ............ A01M 29/10

OTHER PUBLICATIONS

English WO-2010023253-A1.*

(Continued)

*Primary Examiner* — Yazan A Soofi
(74) *Attorney, Agent, or Firm* — John R. Pivnichny; Law Office of Jim Boice

(57) ABSTRACT

A computer-implemented method, system, and/or computer program product optimizes an operation of an aerial drone to transport a product to a customer. Processor(s) receive an order for a product from a customer. In response to determining that the customer is authorized to have the product delivered by the aerial drone, the processor(s) identify a weight, size, item type, and value of the product, and determine whether the aerial drone is physically able to lift and transport the product, based on a distance to the customer and a cost effectiveness of using the aerial drone over another mode of transportation. The aerial drone is coupled to the product and launched. In response to sensors on the aerial drone detecting a change in flight conditions while the aerial drone is flying to the customer, a drone on-board computer disengages an electric motor and engages an internal combustion on the aerial drone.

20 Claims, 4 Drawing Sheets

(56) References Cited

U.S. PATENT DOCUMENTS

| | | | | |
|---|---|---|---|---|
| 2015/0370251 A1* | 12/2015 | Siegel | ................... | G05D 1/0027 |
| | | | | 701/2 |
| 2016/0196750 A1* | 7/2016 | Collins | ................ | B64C 39/024 |
| | | | | 701/14 |
| 2016/0253907 A1* | 9/2016 | Taveira | .................. | G08G 5/006 |
| | | | | 701/3 |
| 2016/0318627 A1* | 11/2016 | Lucas | ....................... | G10K 9/20 |
| 2016/0328979 A1* | 11/2016 | Postrel | .................. | B64C 39/024 |

OTHER PUBLICATIONS

V. Pandit et al., "A Study on Amazon Prime Air for Feasibility and Profitability—A Graphical Data Analysis." IOSR Journal of Business and Management, vol. 16, No. 11, Ver. 1, Nov. 2014, pp. 6-11.

P. McGlone, "UAV Feasibility in Short Range Parcel Delivery", LinkedIn Corporation, Pulse, www.linkedin.com, Mar. 24, 2015, pp. 1-6.

C. Lewis, "Is Package Delivery Using Drones Feasible?" Robots Association, robohub.org, Dec. 3, 2014, pp. 1-4.

C. Lewis, "The Economics of Amazon's Delivery Drones", Robots Association, robohub.org, Jun. 18, 2014, pp. 1-3.

* cited by examiner

DELIVERING SELECTED PRODUCTS WITH AERIAL DRONES

BACKGROUND

The present disclosure relates to the field of aerial drones, and specifically to aerial drones that deliver products to customers. More specifically, the present disclosure relates to matching orders to specific aerial drones, and controlling the aerial drones through the delivery process.

An aerial drone is an unmanned aircraft, also known as an unmanned aerial vehicle (UAV). That is, an aerial drone is an airborne vehicle that is capable of being piloted without an on-board human pilot. If autonomously controlled using an on-board computer and pre-programmed instructions, a UAV is called an autonomous drone. If remotely piloted by a human pilot, the UAV is called a remotely piloted aircraft (RPA).

SUMMARY

A computer-implemented method, system, and/or computer program product optimizes an operation of an aerial drone to transport a product to a customer. One or more processors receive an online order for a product from a customer. The product is initially stored in a warehouse. The processor(s) determine whether the customer is authorized to have the product delivered by an aerial drone. The aerial drone has a predetermined travel range. The aerial drone has an electric motor and an internal combustion engine as power sources for turning propellers on the aerial drone. In response to determining that the customer is authorized to have the product delivered by the aerial drone, the processor(s) identify a weight, size, item type, and value of the product. The processor(s) then determine whether the aerial drone is physically able to lift and transport the product having the identified weight, size, item type, and value while using the electric motor as the power system for the propellers on the aerial drone. The processor(s) retrieve a physical address of the customer, and then calculate a distance from the warehouse to the physical address of the customer. The processor(s) compare a first cost of delivering the product using the aerial drone to a second cost of delivering the product using a ground-based mode of transportation. In response to the distance from the warehouse to the physical address of the customer being less than the predetermined travel range of the aerial drone, and in response to the first cost being less than the second cost, and in response to the aerial drone being physically able to lift and transport the product, the processor(s) assign the aerial drone to deliver the product to the customer. An electrically actuated retention device then couples the aerial drone to the product, and a drone on-board computer launches the aerial drone, with the product coupled to the aerial drone, from the warehouse towards the physical address of the customer. At this point, the electric motor is engaged to the propellers on the aerial drone. In response to sensors on the aerial drone detecting a change in flight conditions while the aerial drone is flying between the warehouse and the physical address of the customer, the drone on-board computer disengages the electric motor from the propellers and engages an internal combustion engine to the propellers.

In one or more embodiments, the assignment of the product to be delivered by a drone, if at all, is performed by an Order Fulfillment System, a Drone Deliver Feasibility Analytics System, and/or a Drone Delivery System.

DETAILED DESCRIPTION

Figure 1:
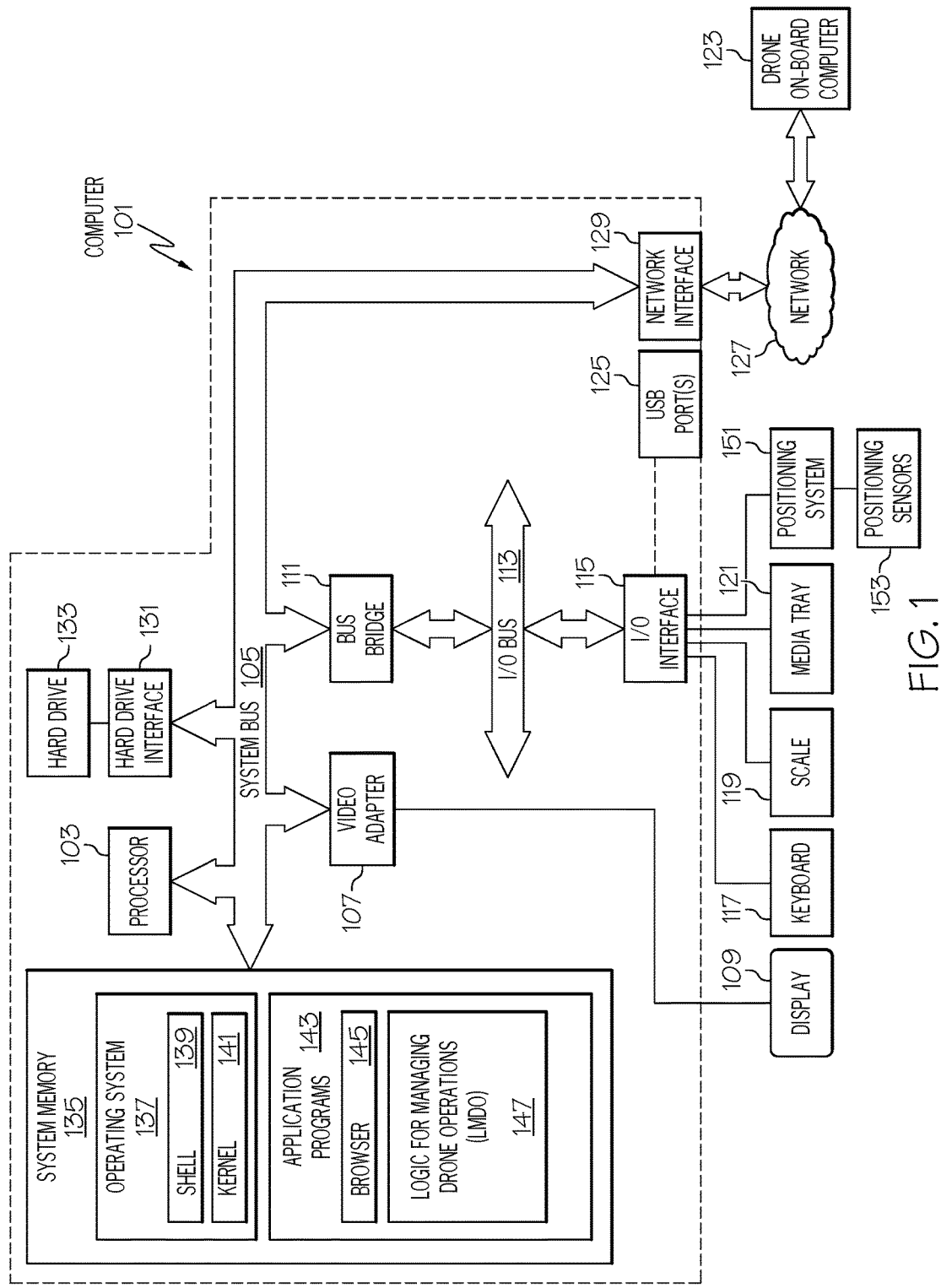
FIG. 1 depicts an exemplary system and network in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by drone on-board computer 123 and/or positioning system 151 shown in FIG. 1, and/or drone on-board computer 223 shown in FIG. 2.

Exemplary computer 101 includes a processor 103 that is coupled to a system bus 105. Processor 103 may utilize one or more processors, each of which has one or more processor cores. A video adapter 107, which drives/supports a display 109, is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a scale 119 (i.e., a digital weight scale), a media tray 121 (which may include storage devices such as CD-ROM drives, multi-media interfaces, etc.), and external USB port(s) 125. While the format of the ports connected to I/O interface 115 may be any known to those skilled in the art of computer architecture, in one embodiment some or all of these ports are universal serial bus (USB) ports.

Also coupled to I/O interface 115 is a positioning system 151, which determines a position of computer 101 and/or other devices using positioning sensors 153. Positioning sensors 153, which may be any type of sensors that are able to determine a position of a device, including computer 101, an aerial drone 301 shown in FIG. 3, etc. Positioning sensors 153 may utilize, without limitation, satellite based positioning devices (e.g., global positioning system—GPS based devices), accelerometers (to measure change in movement), barometers (to measure changes in altitude), etc.

As depicted, computer 101 is able to communicate with a software deploying server 149 and/or other devices/systems (e.g., drone on-board computer 123) using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory also include Logic for Managing Drone Operations (LMDO) 147. LMDO 147 includes code for implementing the processes described below, including those described in FIGS. 2-4.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

Figure 2:
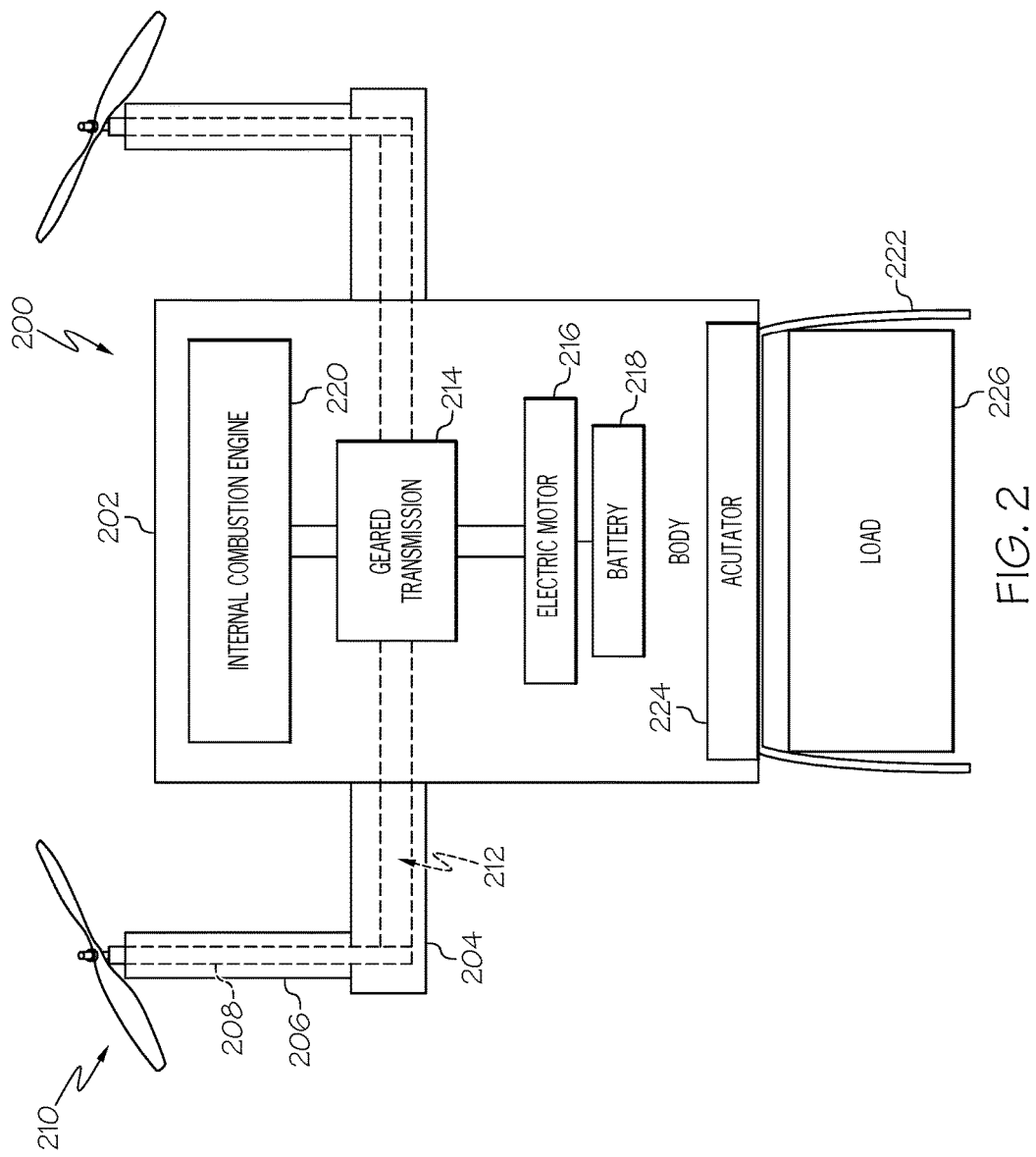
FIG. 2 depicts additional detail of an exemplary aerial drone in accordance with one or more embodiments of the present invention.

FIG. 2 illustrates control hardware in an exemplary aerial drone 200 in accordance with one or more embodiments of the present invention. The terms "aerial drone", "drone", and "UAV" are used interchangeably herein to identify and describe an airborne vehicle that is capable of pilot-less flight and carrying a product to a customer.

As shown in FIG. 2, aerial drone 200 includes a body 202, which is attached to supports such as support 204. Supports such as support 204 support stanchions such as stanchion 206. Such stanchions provide a housing for a driveshaft within each of the stanchions, such as the depicted driveshaft 208 within stanchion 206. These driveshafts are connected to propellers. For example, driveshaft 208 within stanchion 206 is connected to propeller 210.

A power transfer mechanism 212 (e.g., a chain, a primary driveshaft, etc.) transfers power from a geared transmission 214 to the driveshafts within the stanchions (e.g., from geared transmission 214 to the driveshaft 208 inside stanchion 206), such that propeller 210 is turned. Geared transmission 214 preferably contains a plurality of gears, such that a gear ratio inside geared transmission 214 can be selectively changed.

Power to the geared transmission 214 is selectively provided by an electric motor 216 (which is supplied with electrical power by a battery 218) or an internal combustion engine 220, which burns fuel from a fuel tank (not shown). In one or more embodiments of the present invention, the internal combustion engine 220 has greater power than the electric motor 216, since internal combustion engines are able to produce greater torque/power than electric motors of the same size/weight.

Affixed to the bottom of body 202 is a retention device 222. Retention device 222 is a hinged structure that preferably is configured/manipulated by an internal electro-mechanical actuator 224 that opens and closes the throat of the retention device 222. When the actuator 224 causes the throat of retention device 222 to close, a load 226 (i.e., a product being delivered to a customer) is secured to the aerial drone 200. When the actuator 224 causes the throat of retention device 222 to open, the load 226 is released from the aerial drone 200.

Figure 3:
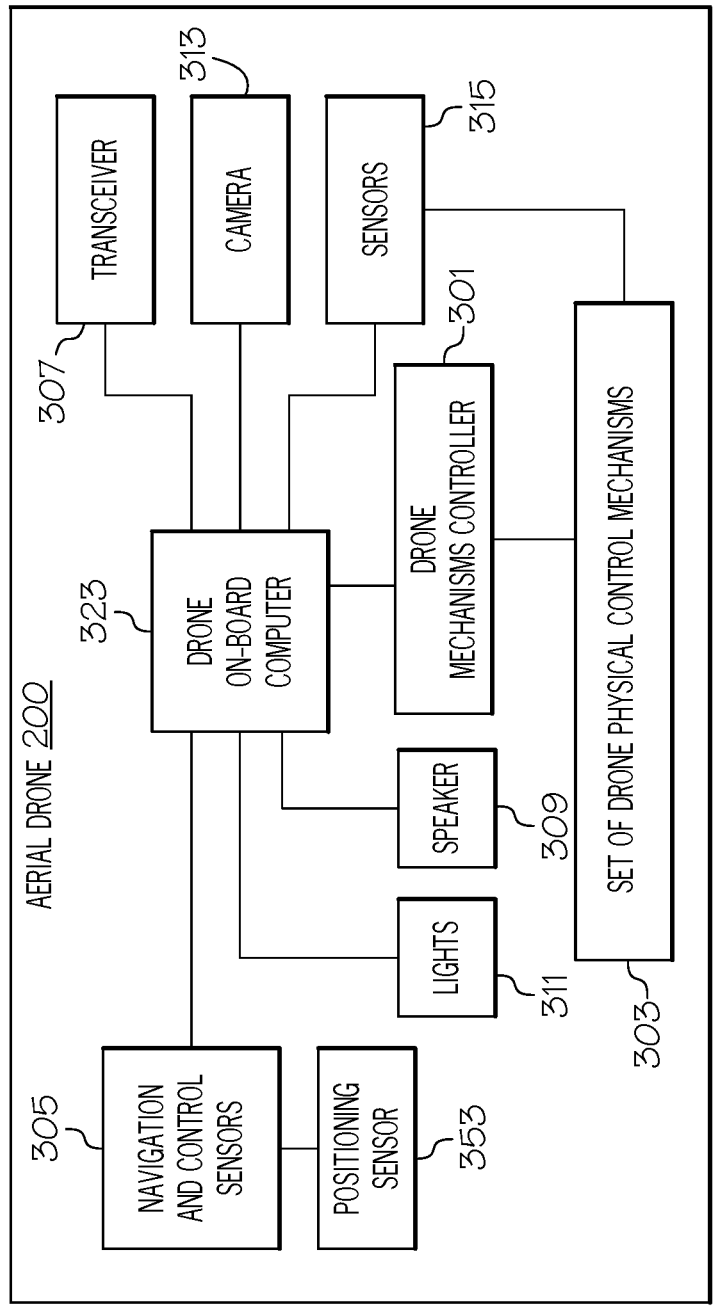
FIG. 3 illustrates control hardware in an exemplary aerial drone in accordance with one or more embodiments of the present invention.

With reference now to FIG. 3, exemplary control hardware within aerial drone 200 presented in FIG. 2 is depicted.

A drone on-board computer 323 (analogous to drone on-board computer 123 shown in FIG. 1) controls a drone mechanism controller 301, which is a computing device that controls a set of drone physical control mechanisms 303. The set of drone physical control mechanisms 303 include, but are not limited to, throttles for internal combustion engine 220 and/or electric motor 216, selectors for selecting gear ratios within the geared transmission 214, controls for adjusting the pitch, roll, and angle of attack of propellers such as propeller 210, actuator 224, and other controls used to control the operation of the aerial drone 200 depicted in FIG. 2.

Whether in autonomous mode or remotely-piloted mode, the drone on-board computer 323 controls the operation of aerial drone 200. This control includes the use of outputs from navigation and control sensors 211 to control the aerial drone 200. Navigation and control sensors 305 include hardware sensors that (1) determine the location of the aerial drone 200; (2) sense other aerial drones and/or obstacles and/or physical structures around aerial drone 200; (3) measure the speed and direction of the aerial drone 200; and (4) provide any other inputs needed to safely control the movement of the aerial drone 200.

With respect to the feature of (1) determining the location of the aerial drone 200, this is achieved in one or more embodiments of the present invention through the use of a positioning system such as positioning system 151 shown in FIG. 1. Positioning system 151 may use a global positioning system (GPS), which uses space-based satellites that provide positioning signals that are triangulated by a GPS receiver to determine a 3-D geophysical position of the aerial drone 200. Positioning system 151 may also use, either alone or in conjunction with a GPS system, physical movement sensors such as accelerometers (which measure changes in direction and/or speed by an aerial drone in any direction in any of three dimensions), speedometers (which measure the instantaneous speed of an aerial drone), air-flow meters (which measure the flow of air around an aerial drone), barometers (which measure altitude changes by the aerial drone), etc. Such physical movement sensors may incorporate the use of semiconductor strain gauges, electromechanical gauges that take readings from drivetrain rotations, barometric sensors, etc.

With respect to the feature of (2) sensing other aerial drones and/or obstacles and/or physical structures around aerial drone 200, the positioning system 151 may use radar or other electromagnetic energy that is emitted from an electromagnetic radiation transmitter (e.g., transceiver 307 shown in FIG. 3), bounced off a physical structure (e.g., a building, bridge, or another aerial drone), and then received by an electromagnetic radiation receiver (e.g., transceiver 323). By measuring the time it takes to receive back the emitted electromagnetic radiation, and/or evaluating a Doppler shift (i.e., a change in frequency to the electromagnetic radiation that is caused by the relative movement of the aerial drone 200 to objects being interrogated by the electromagnetic radiation) in the received electromagnetic radiation from when it was transmitted, the presence and location of other physical objects can be ascertained by the drone on-board computer 323.

With respect to the feature of (3) measuring the speed and direction of the aerial drone 200, this is accomplished in one or more embodiments of the present invention by taking readings from an on-board airspeed indicator (not depicted) on the aerial drone 200 and/or detecting movements to the control mechanisms (depicted in FIG. 2) on the aerial drone 200 and/or the positioning system 151 discussed above.

With respect to the feature of (4) providing any other inputs needed to safely control the movement of the aerial drone 200, such inputs include, but are not limited to, control signals to activate a horn (e.g., speaker 309), flash emergency lights (e.g., lights 311), etc. on the aerial drone 200.

Also on aerial drone 200 in one or more embodiments of the present invention is a camera 313, which is capable of sending still or moving digital photographic images to the drone on-board computer 323.

Also on aerial drone 200 in one or more embodiments of the present invention are sensors 315. Examples of sensors 315 include, but are not limited to, air pressure gauges, microphones, barometers, chemical sensors, vibration sensors, etc., which detect a real-time operational condition of aerial drone 200 and/or an environment around aerial drone 200.

Figure 4:
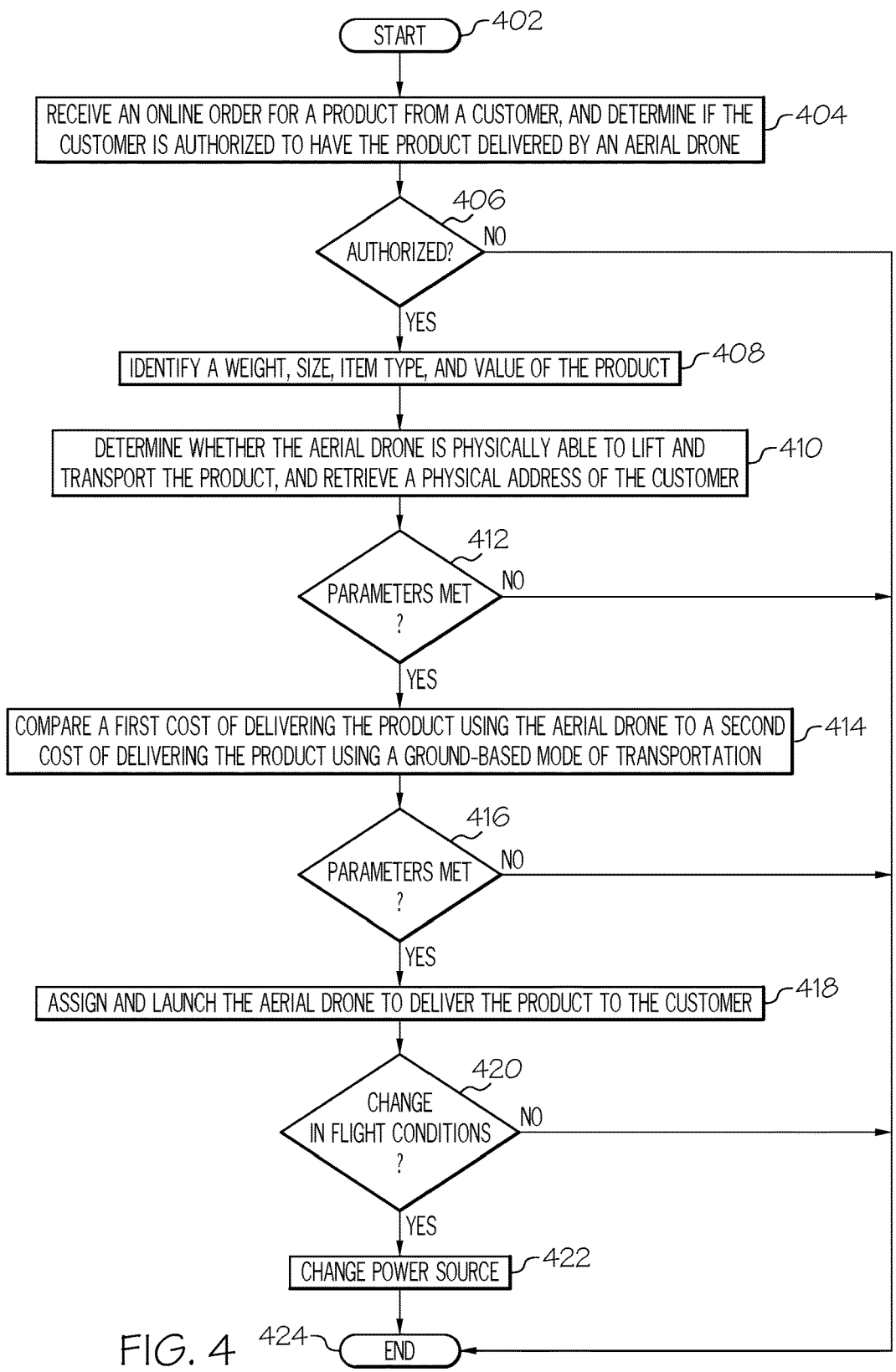
FIG. 4 is a high-level flow chart of one or more steps performed by one or more computing devices to optimize an operation of an aerial drone to transport a product to a customer.

With reference now to FIG. 4, a high-level flow chart of one or more steps performed by one or more computing devices to optimize an operation of an aerial drone to transport a product to a customer is presented.

After initiator block 402, one or more processors receive an online order for a product from a customer, as depicted in block 404. (In one or more embodiments, this is performed by an Order Fulfillment System, which incorporates the use of computer 101 with LMDO 147 depicted in FIG. 1.) The product is initially stored in a warehouse or other storage location. The processor(s) then determine whether or not the customer who placed the order is authorized to have the product delivered by an aerial drone (e.g., a "Drone Delivery System"). That is, the system will allow products to be delivered only to preauthorized locations/customers, in order to avoid nefarious or dangerous activity. For example, a customer may not be allowed to have a product transported across a national border, since this would circumvent import/export requirements. Similarly, a product may not be transported by the aerial drone if it would require taking a flight path through restricted air (i.e., where aircraft are prohibited from operating), through a hazardous area (e.g., when crashing the aerial drone could cause an explosion or harm to persons on the ground), etc. Similarly, certain customers may not be authorized to receive products via an aerial drone if they live in an area that cannot handle aerial drone landings (e.g., a high-rise building), they have pets that could be harmed by the aerial drone, they have pets that could pounce on the aerial drone and damage it, etc.

In one or more embodiments of the present invention, A Drone Delivery Feasibility Analysis System (which incorporates the use of computer 101 with LMDO 147 depicted in FIG. 1) reads and utilizes customer profiles, and then verifies eligibility of customer membership plans and preferences for deliveries through drones. If this information is not found in existing customer profiles, then the Drone Deliver Feasibility Analysis System whether or not there is other data to identify whether or not this customer chosen deliveries by drones, particularly for the specific order.

In one or more embodiments of the present invention, the aerial drone has a predetermined travel range, particularly when operating on electric power.

As shown in query block 406, a determination is made as to whether or not the customer that placed the order is authorized to receive the product via the aerial drone. (In one or more embodiments, this is performed by the Drone Deliver Feasibility Analysis System.) If so, then the system (e.g., computer 101 shown in FIG. 1) identifies a weight, size, item type, and value of the product, as depicted in block 408. In one embodiment, all of this information is received from a database/catalogue of products. However, in another embodiment, the weight is derived from a digital scale (e.g., scale 119 shown in FIG. 1), which sends the exact/actual weight of the product to computer 101.

As shown in block 410, the processor(s) then determines whether the aerial drone is physically able to lift and transport the product having the identified weight, size, item type, and value while using the electric motor as the power system for the propellers on the aerial drone. That is, the rated lifting capacity for the aerial drone (as retrieved from a profile database for the aerial drone) is compared to the size and weight of the product being shipped. Furthermore, certain drones may be authorized to carry certain types of products. For example, if the product is a flammable product, then only electric powered aerial drones may transport such a product. Similarly, if a product is worth more than some predetermined value (e.g., more than $1,000 USD), then only an aerial drone that has proper safeguards (e.g., cannot be "hacked" due to an on-board security system that prevents nefarious control signals from being responded to the by the drone on-board computer 323 shown in FIG. 3; has redundant controls and/or power supplies and/or motors, etc.) to ensure that the product is safely delivered to the customer. Alternatively, the product that has more than the predetermined value is placed on a ground mode of transportation (e.g., a truck) rather than the aerial drone.

The processor(s) then retrieve (e.g., from a customer database) a physical address of the customer. Using this information, the processor(s) calculate a distance from the storage warehouse to the physical address of the customer. If the aerial drone is able to lift the product and carry it the required distance (query block 412), then the processor(s) compare a first cost of delivering the product using the aerial drone to a second cost of delivering the product using a ground-based mode of transportation (block 414). That is, the monetary cost of using the aerial drone may exceed some predefined limit, such as the monetary cost of using the ground-based mode of transportation.

As depicted in query block 416, a determination is made as to whether or not the distance from the warehouse to the physical address of the customer is less than the predetermined travel range of the aerial drone, whether current weather conditions (e.g., as identified by sensors on the aerial drone and/or from a weather service) are conducive to aerial drone delivery operations, whether or not the first cost (for using the aerial drone) is less than the second cost (for using the ground-based mode of transportation), and whether or not the aerial drone is physically able to lift and transport the product. If the answer to all of these determinations is "yes" (i.e., the aerial drone has the range, is cost effective, and is physically able to deliver the product), then the processor(s) (e.g., within computer 101 shown in FIG. 1) assign/select/direct the aerial drone to deliver the product to the customer, and launch the aerial drone with the attached product (by using the electrically actuated retention device 222 shown in FIG. 2). That is, the drone on-board computer 323 on board the aerial drone launches the aerial drone with the product coupled to the aerial drone from the warehouse towards the physical address of the customer through use of the drone mechanisms controller 301 and the set of drone physical control mechanisms 303 shown in FIG. 3. Initially, the electric motor (e.g., electric motor 216 shown in FIG. 2) is engaged to the propellers (e.g., propeller 210 shown in FIG. 2) on the aerial drone.

As shown in block 420, a query is made as to whether or not there are any changes to flight conditions while the aerial drone is transporting the product. That is, the drone on-board computer receives sensor readings from sensors (e.g., sensors 315 shown in FIG. 3) on the aerial drone. These sensor readings detect a change in flight conditions while the aerial drone is flying between the warehouse and the physical address of the customer. If so, then the drone on-board computer directs the drone mechanisms controller 301 to disengage the electric motor from the propellers and to engage the more powerful internal combustion engine to the propellers. The internal combustion engine thus provides the needed power to handle the change in flight conditions, such as bad weather, obstacles, birds, other aerial drones, etc.

Thus, in one embodiment of the present invention, one or more sensors (e.g., camera 313 and/or sensors 315 shown in FIG. 3) that are affixed to the aerial drone identify aerial obstacles between the warehouse and the physical address of the customer that the aerial drone must fly around. In one embodiment, this change in flight conditions is caused by aerial obstacles, such as buildings, bridges, birds, other aerial drones, etc. The drone on-board computer 323 then adjusts a physical configuration of the aerial drone (e.g., changes propeller pitch, increases throttle, changes direction, etc.) based on the aerial obstacles between the warehouse and the physical address of the customer.

After a while, the aerial drone may revert back to using the electric motor (e.g., weather conditions improve, etc.). Now, however, the aerial drone will likely be too quiet to scare away birds in its flight path. Therefore, the drone on-board computer 323, in response to receiving sensor indications (e.g., from camera 313) that birds are on its flight path, will generate a tone (preferably between 1 Khz and 4 Khz, which is deemed most effective in dispersing birds) that is produced on a speaker (e.g., speaker 309 in FIG. 3).

In another embodiment of the present invention, if the drone on-board computer 323 determines, based on images sent from camera 313, that it is on course to come near another aircraft (drone or piloted), the drone on-board computer 323 will adjust flight control surfaces (e.g., propeller pitch/roll/collective controllers) on the aerial drone to avoid flying near said another aircraft. Similarly, if sensors detect that the aerial drone is about to fly into hazardous weather (i.e., a "change in flight conditions"), then the drone on-board computer 323 will adjust flight control surfaces (e.g., propeller pitch/roll/collective controllers) on the aerial drone to avoid flying near or through such weather.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A computer-implemented method of optimizing an operation of an aerial drone to transport a product to a customer, the computer-implemented method comprising:
  receiving, by one or more processors, an online order for a product from a customer, wherein the product is initially stored in a warehouse;
  determining, by one or more processors, whether the customer is authorized to have the product delivered by an aerial drone, wherein the aerial drone has a predetermined travel range, and wherein the aerial drone has an electric motor and an internal combustion engine as power sources for turning propellers on the aerial drone;
  in response to determining that the customer is authorized to have the product delivered by the aerial drone, identifying, by one or more processors, a weight, size, item type, and value of the product;
  determining, by one or more processors, whether the aerial drone is physically able to lift and transport the product having the identified weight, size, item type, and value while using the electric motor as the power system for the propellers on the aerial drone;
  retrieving, by one or more processors, a physical address of the customer;

calculating, by one or more processors, a distance from the warehouse to the physical address of the customer;

comparing, by one or more processors, a first cost of delivering the product using the aerial drone to a second cost of delivering the product using a ground-based mode of transportation;

in response to the distance from the warehouse to the physical address of the customer being less than the predetermined travel range of the aerial drone, and in response to the first cost being less than the second cost, and in response to the aerial drone being physically able to lift and transport the product, assigning, by one or more processors, the aerial drone to deliver the product to the customer;

coupling, via an electrically actuated retention device, the aerial drone to the product;

launching, by a drone on-board computer on the aerial drone, the aerial drone with the product coupled to the aerial drone from the warehouse towards the physical address of the customer, wherein the electric motor is engaged to the propellers on the aerial drone;

receiving, by the drone on-board computer, sensor readings from sensors on the aerial drone, wherein the sensor readings detect a change in flight conditions while the aerial drone is flying between the warehouse and the physical address of the customer; and in response to the sensors on the aerial drone detecting a change in the flight conditions while the aerial drone is flying between the warehouse and the physical address of the customer, disengaging, by the drone on-board computer, the electric motor from the propellers and engaging an internal combustion engine to the propellers.

2. The computer-implemented method of claim 1, further comprising:
identifying, by one or more sensors affixed to the aerial drone, aerial obstacles between the warehouse and the physical address of the customer that the aerial drone must fly around, wherein the aerial obstacles are the change in flight conditions; and
adjusting, by the drone on-board computer, a physical configuration of the aerial drone based on the aerial obstacles between the warehouse and the physical address of the customer.

3. The computer-implemented method of claim 2, further comprising:
identifying, by a camera mounted on the aerial drone, the aerial obstacles as a flock of birds, wherein a presence of the flock of birds is the change in flight conditions.

4. The computer-implemented method of claim 3, further comprising:
in response to the sensors affixed to the aerial drone detecting a subsequent change in the flight conditions while the aerial drone is flying between the warehouse and the physical address of the customer, disengaging, by the drone on-board computer, the internal combustion engine from the propellers and engaging the electric motor to the propellers; and
emitting, from a speaker on the aerial drone, a tone between 1 Khz and 4 Khz to disperse the flock of birds.

5. The computer-implemented method of claim 2, further comprising:
identifying, by a camera mounted on the aerial drone, the aerial obstacles as another aircraft, wherein a presence of said another aircraft is the change in flight conditions; and adjusting, by the drone on-board computer, flight control surfaces on the aerial drone to avoid flying near said another aircraft.

6. The computer-implemented method of claim 1, further comprising:
identifying, by a set of sensors mounted on the aerial drone, the change in flight conditions as a change in weather conditions between the warehouse and the physical address of the customer, wherein the change in weather conditions presents a hazardous weather condition to the aerial drone; and
adjusting, by the drone on-board computer, flight control surfaces on the aerial drone to avoid flying through the hazardous weather condition.

7. The computer-implemented method of claim 1, further comprising:
determining that the value of the product exceeds a predetermined value; and
in response to determining that the value of the product exceeds the predetermined value, removing the product from the aerial drone and placing the product on the ground-based mode of transportation.

8. A computer program product for optimizing an operation of an aerial drone to transport a product to a customer, the computer program product comprising a non-transitory computer readable storage medium having program code embodied therewith, the program code readable and executable by a processor to perform a method comprising:
receiving an online order for a product from a customer, wherein the product is initially stored in a warehouse;
determining whether the customer is authorized to have the product delivered by an aerial drone, wherein the aerial drone has a predetermined travel range, and wherein the aerial drone has an electric motor and an internal combustion engine as power sources for turning propellers on the aerial drone;
in response to determining that the customer is authorized to have the product delivered by the aerial drone, identifying a weight, size, item type, and value of the product;
determining whether the aerial drone is physically able to lift and transport the product having the identified weight, size, item type, and value while using the electric motor as the power system for the propellers on the aerial drone;
retrieving a physical address of the customer;
calculating a distance from the warehouse to the physical address of the customer;
comparing a first cost of delivering the product using the aerial drone to a second cost of delivering the product using a ground-based mode of transportation;
in response to the distance from the warehouse to the physical address of the customer being less than the predetermined travel range of the aerial drone, and in response to the first cost being less than the second cost, and in response to the aerial drone being physically able to lift and transport the product, assigning the aerial drone to deliver the product to the customer;
coupling, via an electrically actuated retention device, the aerial drone to the product;
launching, by a drone on-board computer on the aerial drone, the aerial drone with the product coupled to the aerial drone from the warehouse towards the physical address of the customer, wherein the electric motor is engaged to the propellers on the aerial drone;

wherein the sensor readings detect a change in flight conditions while the aerial drone is flying between the warehouse and the physical address of the customer; and in response to the sensors on the aerial drone detecting a change in the flight conditions while the aerial drone is flying between the warehouse and the physical address of the customer, disengaging, by the drone on-board computer, the electric motor from the propellers and engaging an internal combustion engine to the propellers.

9. The computer program product of claim 8, wherein the method further comprises:

identifying, based on sensor readings from one or more sensors affixed to the aerial drone, aerial obstacles between the warehouse and the physical address of the customer that the aerial drone must fly around, wherein the aerial obstacles are the change in flight conditions; and adjusting, by the drone on-board computer, a physical configuration of the aerial drone based on the aerial obstacles between the warehouse and the physical address of the customer.

10. The computer program product of claim 9, wherein the method further comprises:

identifying, based on images captured by a camera mounted on the aerial drone, the aerial obstacles as a flock of birds, wherein a presence of the flock of birds is the change in flight conditions.

11. The computer program product of claim 10, wherein the method further comprises:

in response to the sensors on the aerial drone detecting a subsequent change in the flight conditions while the aerial drone is flying between the warehouse and the physical address of the customer, disengaging, via the drone on-board computer, the internal combustion engine from the propellers and engaging the electric motor to the propellers; and emitting, via a speaker on the aerial drone, a tone between 1 Khz and 4 Khz to disperse the flock of birds.

12. The computer program product of claim 9, wherein the method further comprises:

identifying, by a camera mounted on the aerial drone, the aerial obstacles as another aircraft, wherein a presence of said another aircraft is the change in flight conditions; and adjusting, by the drone on-board computer, flight control surfaces on the aerial drone to avoid flying near said another aircraft.

13. The computer program product of claim 8, wherein the method further comprises:

identifying, by a set of sensors mounted on the aerial drone, the change in flight conditions as a change in weather conditions between the warehouse and the physical address of the customer, wherein the change in weather conditions presents a hazardous weather condition to the aerial drone; and adjusting, by the drone on-board computer, flight control surfaces on the aerial drone to avoid flying through the hazardous weather condition.

14. The computer program product of claim 8, wherein the method further comprises:

determining that the value of the product exceeds a predetermined value; and in response to determining that the value of the product exceeds the predetermined value, removing the product from the aerial drone and placing the product on the ground-based mode of transportation.

15. A computer system comprising:

a processor, a computer readable memory, and a non-transitory computer readable storage medium;

first program instructions to receive an online order for a product from a customer, wherein the product is initially stored in a warehouse;

second program instructions to determine whether the customer is authorized to have the product delivered by an aerial drone, wherein the aerial drone has a predetermined travel range, and wherein the aerial drone has an electric motor and an internal combustion engine as power sources for turning propellers on the aerial drone;

third program instructions to, in response to determining that the customer is authorized to have the product delivered by the aerial drone, identify a weight, size, item type, and value of the product;

fourth program instructions to determine whether the aerial drone is physically able to lift and transport the product having the identified weight, size, item type, and value while using the electric motor as the power system for the propellers on the aerial drone;

fifth program instructions to retrieve a physical address of the customer;

sixth program instructions to calculate a distance from the warehouse to the physical address of the customer;

seventh program instructions to compare a first cost of delivering the product using the aerial drone to a second cost of delivering the product using a ground-based mode of transportation;

eighth program instructions to, in response to the distance from the warehouse to the physical address of the customer being less than the predetermined travel range of the aerial drone, and in response to the first cost being less than the second cost, and in response to the aerial drone being physically able to lift and transport the product, assign the aerial drone to deliver the product to the customer;

ninth program instructions to couple, via an electrically actuated retention device, the aerial drone to the product;

tenth program instructions to launch, by a drone on-board computer on the aerial drone, the aerial drone with the product coupled to the aerial drone from the warehouse towards the physical address of the customer, wherein the electric motor is engaged to the propellers on the aerial drone;

eleventh program instructions to receive sensor readings from sensors on the aerial drone, wherein the sensor readings detect a change in flight conditions while the aerial drone is flying between the warehouse and the physical address of the customer; and twelfth program instructions to, in response to the sensors on the aerial drone detecting a change in the flight conditions while the aerial drone is flying between the warehouse and the physical address of the customer, disengage the electric motor from the propellers and engaging an internal combustion engine to the propellers; and wherein the first, second, third, fourth, fifth, sixth, seventh, eighth, ninth, tenth, eleventh, and twelfth program instructions are stored on the non-transitory computer readable storage medium for execution by one or more processors via the computer readable memory.

16. The computer system of claim 15, further comprising:
thirteenth program instructions to identify, based on sensor readings from one or more sensors affixed to the aerial drone, aerial obstacles between the warehouse and the physical address of the customer that the aerial drone must fly around, wherein the aerial obstacles are the change in flight conditions; and
fourteenth program instructions to adjust, by the drone on-board computer, a physical configuration of the aerial drone based on the aerial obstacles between the warehouse and the physical address of the customer; and wherein
the thirteenth and fourteenth program instructions are stored on the non-transitory computer readable storage medium for execution by one or more processors via the computer readable memory.

17. The computer system of claim 16, further comprising:
fifteenth program instructions to identify, based on images captured by a camera mounted on the aerial drone, the aerial obstacles as a flock of birds, wherein a presence of the flock of birds is the change in flight conditions; and wherein
the fifteenth program instructions are stored on the non-transitory computer readable storage medium for execution by one or more processors via the computer readable memory.

18. The computer system of claim 17, further comprising:
sixteenth program instructions to, in response to the sensors on the aerial drone detecting a subsequent change in the flight conditions while the aerial drone is flying between the warehouse and the physical address of the customer, disengage the internal combustion engine from the propellers and engaging the electric motor to the propellers; and
seventeenth program instructions to emit, via a speaker on the aerial drone, a tone between 1 Khz and 4 Khz to disperse the flock of birds; and wherein
the sixteenth and seventeenth program instructions are stored on the non-transitory computer readable storage medium for execution by one or more processors via the computer readable memory.

19. The computer system of claim 16, further comprising:
fifteenth program instructions to identify, based on images captured by a camera mounted on the aerial drone, the aerial obstacles as another aircraft, wherein a presence of said another aircraft is the change in flight conditions; and
sixteenth program instructions to adjust flight control surfaces on the aerial drone to avoid flying near said another aircraft; and wherein
the fifteenth and sixteenth program instructions are stored on the non-transitory computer readable storage medium for execution by one or more processors via the computer readable memory.

20. The computer system of claim 15, further comprising:
thirteenth program instructions to identify, based on sensor readings from a set of sensors mounted on the aerial drone, the change in flight conditions as a change in weather conditions between the warehouse and the physical address of the customer, wherein the change in weather conditions presents a hazardous weather condition to the aerial drone; and
fourteenth program instructions to adjust flight control surfaces on the aerial drone to avoid flying through the hazardous weather condition; and wherein
the thirteenth and fourteenth program instructions are stored on the non-transitory computer readable storage medium for execution by one or more processors via the computer readable memory.

* * * * *